United States Patent
Gass

(10) Patent No.: US 11,151,973 B2
(45) Date of Patent: Oct. 19, 2021

(54) METHOD FOR MASKING A NOISE OF A MOTOR VEHICLE, AND MOTOR VEHICLE

(71) Applicant: Audi AG, Ingolstadt (DE)

(72) Inventor: Christoph Gass, Gaimersheim (DE)

(73) Assignee: Audi AG, Ingolstadt (DE)

(*) Notice: Subject to any disclaimer, the term of this patent is extended or adjusted under 35 U.S.C. 154(b) by 0 days.

(21) Appl. No.: 16/965,250

(22) PCT Filed: Feb. 5, 2019

(86) PCT No.: PCT/EP2019/052682
§ 371 (c)(1),
(2) Date: Jul. 27, 2020

(87) PCT Pub. No.: WO2019/158387
PCT Pub. Date: Aug. 22, 2019

(65) Prior Publication Data
US 2021/0104216 A1    Apr. 8, 2021

(30) Foreign Application Priority Data
Feb. 16, 2018 (DE) ............... 10 2018 202 392.1

(51) Int. Cl.
*G10K 11/175* (2006.01)
*B60L 50/50* (2019.01)

(52) U.S. Cl.
CPC ......... *G10K 11/1752* (2020.05); *B60L 50/50* (2019.02); *B60L 2270/142* (2013.01); *G10K 2210/1282* (2013.01)

(58) Field of Classification Search
CPC ............... G10K 11/175; B60L 2270/142
(Continued)

(56) References Cited

U.S. PATENT DOCUMENTS 6,560,088 B1 * 5/2003 Beck ............... F01L 9/20
361/154
6,912,286 B1 * 6/2005 Daly ............... G10K 11/1783
381/71.1
(Continued)

FOREIGN PATENT DOCUMENTS

DE    10322554 A1   12/2004
DE    102004039066 A1   4/2005
(Continued)

OTHER PUBLICATIONS

International Search Report and Written Opinion of the International Searching Authority directed to related International Patent Application No. PCT/EP2019/052682, dated Jun. 6, 2019, with attached English-language translation; 18 pages.
(Continued)

*Primary Examiner* — Jerry D Robbins
(74) *Attorney, Agent, or Firm* — Sterne, Kessler, Goldstein & Fox P.L.L.C.

(57) ABSTRACT

The present disclosure relates to a method for masking a first noise which is generated by a part of a motor vehicle under a certain triggering condition, wherein, to mask the first noise, at least one second noise is superimposed on the first noise, and wherein the first noise is generated by closing at least one main contactor assigned to a battery of the motor vehicle.

18 Claims, 2 Drawing Sheets

(58) Field of Classification Search
USPC .......................................................... 381/71.4
See application file for complete search history.

(56) References Cited

U.S. PATENT DOCUMENTS

| | | | | |
|---|---|---|---|---|
| 10,636,407 | B2* | 4/2020 | Speidel | H02P 29/50 |
| 2005/0261815 | A1 | 11/2005 | Cowelchuk et al. | |
| 2008/0240456 | A1* | 10/2008 | Sakamoto | G10K 11/17854 381/71.4 |
| 2010/0226059 | A1* | 9/2010 | Brown | H02J 7/0031 361/160 |
| 2010/0266135 | A1* | 10/2010 | Theobald | G10K 11/17873 381/71.4 |
| 2011/0172859 | A1* | 7/2011 | Sankaran | H02P 6/10 701/22 |
| 2014/0198919 | A1 | 7/2014 | Ballnik et al. | |
| 2014/0356686 | A1 | 12/2014 | Namou et al. | |
| 2016/0190841 | A1 | 6/2016 | Galamb | |

FOREIGN PATENT DOCUMENTS

| | | | |
|---|---|---|---|
| DE | 102005021541 A1 | 12/2005 | |
| DE | 102004031657 A1 | 2/2006 | |
| DE | 102013215563 A1 | 2/2015 | |
| DE | 102013222495 A1 | 5/2015 | |
| DE | 102014220600 A1 | 4/2016 | |
| DE | 102014220602 A1 | 4/2016 | |
| DE | 102015122194 A1 | 6/2017 | |
| JP | 2005-278301 * | 10/2005 | ............... B60J 5/00 |
| JP | 2005-278301 A | 10/2005 | |
| KR | 2014/0031024 A | 3/2014 | |

OTHER PUBLICATIONS

International Preliminary Report on Patentability directed to related International Patent Application No. PCT/EP2019/052682, completed May 8, 2020, with attached English-language translation; 10 pages.
Chinese Application No. 20 1980013248.2, Office Action dated Feb. 24, 2021, 7 pages.

* cited by examiner

METHOD FOR MASKING A NOISE OF A MOTOR VEHICLE, AND MOTOR VEHICLE

TECHNICAL FIELD

The present disclosure relates to a method for masking a first noise generated by a part of a motor vehicle under a certain triggering condition, wherein to mask the first noise, at least one second noise is superimposed on the first noise.

BACKGROUND

In the context of motor vehicles, engine noise in the interior is usually to be damped or fully compensated. In this context, the U.S. Pat. No. 6,912,286 B1 describes an active noise cancellation system, which is intended to compensate for the noise generated by the engine of the motor vehicle in the interior by means of anti-noise. The US 2010/0266135 A1 also describes an active noise cancellation system for the passenger compartment. Here, on the one hand, an engine noise is to be actively simulated and output for an electric vehicle, while at the same time a damping of this noise, which is output in the exterior of the vehicle, is to take place in the interior of the vehicle through counter-sound.

SUMMARY

The object of the present disclosure is to provide a method and a motor vehicle to provide the masking of a sound of the motor vehicle, which show advantageous further application areas for masking sounds.

This object is achieved by a method and a motor vehicle with the features according to the respective independent claims. Advantageous designs of the present disclosure are the subject of the dependent patent claims, the description as well as the figures.

In a method, according to the present disclosure, for masking a first noise generated by a part of a motor vehicle under a certain triggering condition, in order to mask the first noise, the first noise is superimposed by at least one second noise. Here the first noise is generated by the closing of at least one main contactor, assigned to a battery of the motor vehicle.

The present disclosure is based on the knowledge that, especially in electric vehicles, the switching of contactors of a high-voltage battery can cause a particularly high level of noise disturbance due to the generated clicking in the interior of the motor vehicle. Such main contactors couple the respective poles, i.e. the positive pole and the negative pole, of the relevant high-voltage battery to the corresponding connections of the high-voltage on-board system of the motor vehicle. For safety reasons, these contactors are opened when the motor vehicle is stationary, i.e. when the vehicle is parked and left for a longer period of time, especially as soon as the ignition is switched off. Accordingly, the main contactors are usually closed again upon actuating or switching on of the ignition by a driver. Sometimes attempts have been made to reduce the loud noise generated by the closing of the main contactors by appropriate noise insulation. However, such noise insulation is very expensive. Embodiments of the present disclosure now make it advantageously possible to mask the first noise caused by the closing of at least one main contactor, in particular both main contactors, by superimposing a second noise. This means that the clicking sound, when closing the main contactors, is at least much less audible to a driver, whereby a much higher quality sonic image can be conveyed by the motor vehicle. Furthermore, no expensive noise insulation is required for this. This masking can now be done in different ways.

In an embodiment of the present disclosure, the at least one second noise represents a noise complementary to the first noise, which is output synchronously in such a way that the first noise and the at least one second noise at least partially superimpose each other in a mutually canceling manner at least at a predetermined position in the interior of the motor vehicle. In other words, compensation, or at least partial compensation, of the first noise can be carried out using counter-sound or active noise cancellation. The great advantage is that the noise generated by main contactors during closing can be compensated much more easily by counter-noise than the noise generated by a motor vehicle engine, for example. This results from the fact that the noise generated when closing the main contactors always sounds almost the same, as the closing procedure of the main contactors is always carried out in the same way. This means that a counter pulse can easily be calculated, then stored for example in a memory of the motor vehicle and then output to at least partially cancel the first noise upon closing of the main contactors. This means that no microphones are required to permanently record the background noise of the environment in order to calculate suitable counter-pulses in real time. This makes the masking of the first sound particularly simple and cost-effective.

In this case, the first noise, which is generated by the closing of at least one main contactor, is triggered when the ignition of the motor vehicle is actuated. The actuation of the ignition of the motor vehicle may thus represent a trigger signal for triggering the output of the at least one second noise. Latency times until the closing of the contactors can also be taken into account. For example, the signal propagation time from the actuation time of the ignition via the CAN bus is approximately 10 milliseconds. This time delay until the closing of the main contactors can therefore also be taken into account when the second noise is output to mask the first noise. At least one loudspeaker in the interior of the motor vehicle may also be provided to output the second noise. The result of the compensation is all the better the more precisely the position of a passenger relative to the loudspeaker is known, since the time from the output of the second sound by the loudspeaker to the ear of a passenger must also be taken into account for the most ideal compensation possible. However, when there is a plurality of passengers in a motor vehicle, it becomes difficult to accomplish a sufficiently good compensation of the first noise for all passengers in the same way.

Therefore, it represents a further advantageous design of the present disclosure if the at least one second noise is output by at least one loudspeaker arranged in a headrest of the motor vehicle. In particular, two loudspeakers may also be provided in a respective headrest so that, at least for a standard seating position of a user, one loudspeaker is arranged on each side of the head, particularly in the area of the ears. Thereby, the runtime of the second noise output by the loudspeaker from the loudspeaker to the user's ear is relatively short, which allows for a particularly precise compensation of the first noise, since the output of the complementary second noise can be tuned separately to the head position of a respective passenger. In particular, appropriate loudspeakers may be provided in each headrest of the motor vehicle so that a sufficiently good quality of compensation can be provided for all passengers of the motor vehicle. This allows advantageously to reduce the residual sound level of the first noise to a minimum.

In addition, the output of the second noise can be made, in particular the counter-sound, as a function of the number of passengers detected in the interior of the motor vehicle, in particular as a function of their positions. If, for example, it is only detected that a person is in the driver's seat, the output of the counter-sound may also be limited to the loudspeakers located in the driver's seat, in particular those located in the headrest. If, for example, a co-driver is also present, the counter-sound can also be output through the loudspeakers, which are located in his/her headrest. The same applies to passengers in the rear seat of the motor vehicle. Which of the seats in the motor vehicle are occupied can be detected by means of simple sensors, for example pressure sensors, an interior camera, belt sensors, etc.

According to further embodiments of the present disclosure, the at least one second noise is output as a tone or a tone sequence with a predetermined minimum volume. Thus, the first noise cannot be compensated for, but it can be covered with a more pleasant tone. This tone or tone sequence may, for example, be a recognition melody in the form of a jingle of the motor vehicle manufacturer. This can also provide a significantly higher quality sonic image of the motor vehicle to a user. This measure is particularly effective and simple because it requires only the playing of a tone or tone sequence, in particular having a determined or determinable minimum volume that allows the first sound to be at least partially drowned out. This does not require any special speaker positioning or knowledge of the positions of the passengers. Also, no special synchronization is required here with the first noise output. For example, as soon as the ignition has been actuated, the second noise can be output, independently of the fact that a short time may pass before sounding the first disturbing noise. Various latencies in signal transmission can thus be neglected. This design is therefore also significantly more cost-effective and easier to implement. In addition, the two described possibilities can also be combined with each other in any desired manner. For example, both a second noise complementary to the first noise can be output in order to compensate as far as possible for this first noise by means of counter-sound, while at the same time a third noise is output in the form of a tone or a tone sequence as described, in order to drown out the remaining residual sound level of the first noise. Especially by combining these two measures it is possible to make the first noise as little audible as possible for a user.

Furthermore, it is advantageous if the tone or tone sequence is output for a first period of time which is longer than a second period of time for which the first noise is generated, and wherein the first period of time comprises the second period of time. Thereby it can be advantageously ensured that the first noise is completely covered by the output tone or sequence of tones.

According to a further particularly advantageous embodiment of the present disclosure, the certain triggering condition represents the initiation of an unlocking procedure for unlocking doors of the motor vehicle, wherein the at least one second noise represents an unlocking noise generated during the unlocking procedure. In other words, the closing of the contactors can be triggered not only upon actuating the ignition, but already before that when unlocking the motor vehicle, for example by means of a central locking system. A noise is generated anyway by such an unlocking device of the motor vehicle. This can be used in an advantageous manner by synchronizing these two procedures in order to superimpose the noise generated during closing of the contactors and thus make it less audible for a user. Thereby it can be advantageously accomplished that finally, when the user is in the interior of the motor vehicle and actuates the ignition of the motor vehicle, no noise at all is output when closing the contactors, because the contactors are already closed in this situation.

This embodiment can also be combined in any desired manner with the previously described embodiments. This will be explained in more detail below.

It is further advantageous that at least one main contactor is opened automatically in the event that no actuation of an ignition is carried out by a user after a predeterminable time. For example, if a user unlocks the motor vehicle and then changes his mind, i.e. he/she does not get into the motor vehicle or actuate the ignition, the main contactors can advantageously be opened again after a predeterminable period of time has elapsed. This is advantageous to ensure that the main contactors do not remain permanently closed in the inactive state of the motor vehicle, which can significantly increase safety. Should it still happen that a user unlocks the doors and only actuates the ignition after this predeterminable time has elapsed, i.e. when the main contactors are already open again, the measures already described can be used to mask the noise which is generated when closing the main contactors.

Therefore, according to some embodiments of the present disclosure, it is provided that, in the event that at least one main contactor is in the open state and an ignition of the motor vehicle is actuated, the noise complementary to the first noise is output and/or the tone or tone sequence is output. Thus an optimal masking of the first noise can be accomplished in every situation.

Furthermore, it is particularly advantageous if the opening of the main contactors after the predeterminable time has elapsed is correlated with an automatic locking procedure for locking the doors of the motor vehicle. For example, it may be provided that the central locking system unlocks the doors of the motor vehicle after actuation. Furthermore, an automatic locking of the doors can also be carried out by means of the central locking system, for example after a predetermined time has elapsed. If the central locking system automatically locks the motor vehicle again after this time, the contactors can be opened again. This opening of the contactors may also be linked to other conditions which are intended to ensure that opening of the contactors during travel is avoided. For example, opening the contactors, which is correlated with the locking procedure of the motor vehicle, may be allowed only if the motor vehicle is stationary and/or no passenger is detected inside the motor vehicle and/or the ignition of the motor vehicle is switched off. In addition, numerous other conditions may also be provided for. This advantageously prevents the opening of the contactors in situations where this is not desired.

Furthermore, the present disclosure also relates to a motor vehicle for masking a first noise which can be generated by a part of the motor vehicle under a certain triggering condition, wherein the motor vehicle is designed for masking the first noise, wherein at least one second noise is superimposed on the first noise. In addition, the motor vehicle is designed to generate the first noise by closing at least one main contactor, assigned to a battery of the motor vehicle.

The advantages mentioned for the method according to the present disclosure and its designs apply in the same manner to the motor vehicle according to the present disclosure.

The present disclosure also includes the combinations of the described embodiments.

The present disclosure also includes further embodiments of the motor vehicle according to the present disclosure, which have features such as those previously described in connection with the further embodiments of the method according to the present disclosure. For this reason, the corresponding embodiments of the motor vehicle according to the present disclosure are not described again here.

BRIEF DESCRIPTION OF THE DRAWINGS

Embodiments of the present disclosure are described below, in which.

DETAILED DESCRIPTION

In the exemplary embodiments disclosed herein, the components of the embodiments that are described each constitute individual features of the present disclosure to be considered independently of one another, which individually also further develop the present disclosure independently of one another and are thus also to be considered part of the present disclosure both individually and in a combination that is different from the combination described. In addition, the embodiments described can also be supplemented by further features of the present disclosure, which have already been described.

In the figures, functionally identical members are each denoted with the same reference signs.

Figure 1:
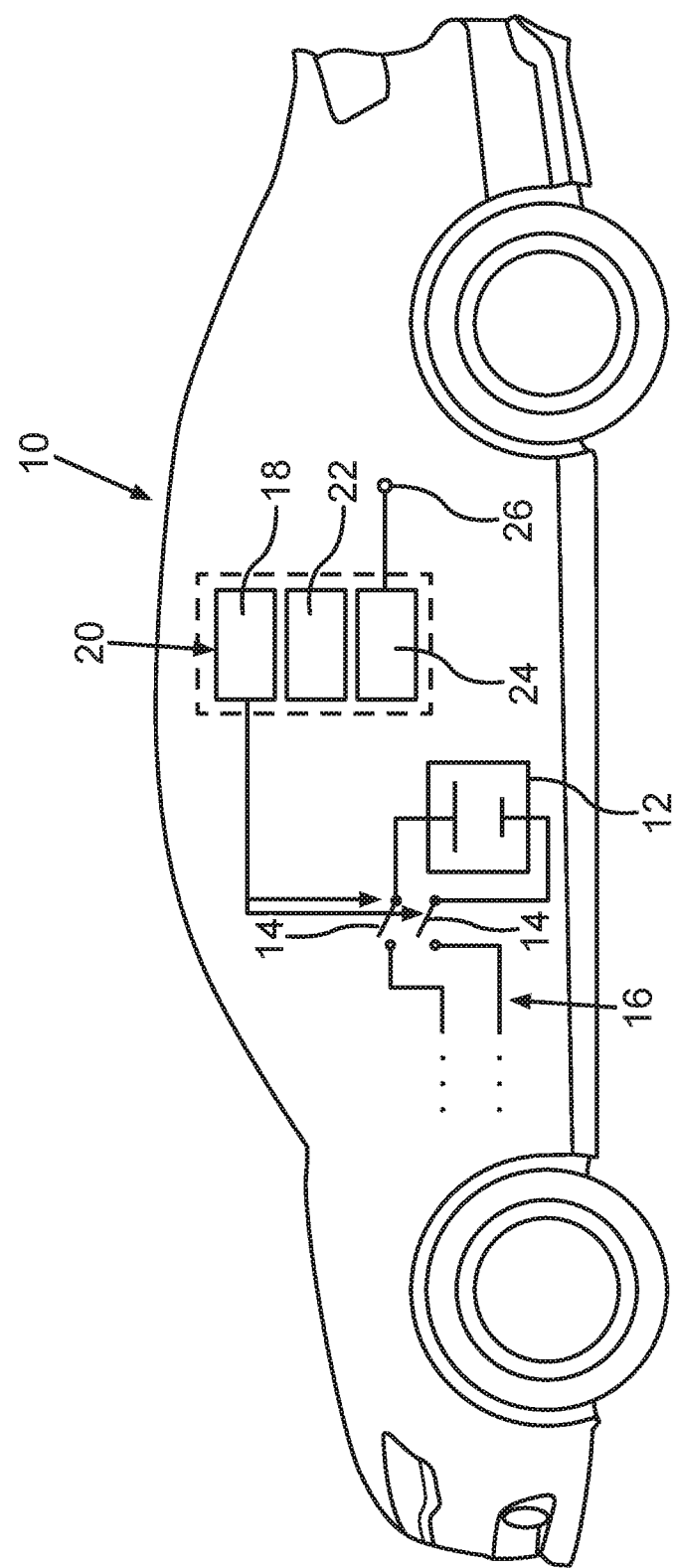
FIG. 1 shows a schematic representation of an example motor vehicle for masking a noise according to example embodiments of the present disclosure.

FIG. 1 shows a schematic representation of a motor vehicle 10 for masking a noise according to example embodiments of the present disclosure. The motor vehicle 10 has a motor vehicle battery 12, which can, for example, be formed as a high-voltage battery. This battery 12 can be coupled to and decoupled from a vehicle electrical system 16 of the motor vehicle 10 via main contactors 14. A control device 18 is provided for controlling these main contactors 14, which may, for example, be part of a control unit 20, which may comprise further control devices. This control unit 20 may also comprise, for example, a central locking system 22 which is designed to control the doors of the motor vehicle as a function of a locking or unlocking signal in order to lock or unlock them. Furthermore, the control unit 20 may also have a control device 24 for controlling at least one loudspeaker 26 of the motor vehicle 10.

When closing the main contactors 14, a noise is generated, which can now advantageously be masked by various measures. If, for example, the ignition of the motor vehicle 10 is actuated, the control device 18 controls the main contactors 14 in order to close them. At the same time, the further control device 24 can also control the at least one loudspeaker 26 in order to output a second noise complementary to this first noise generated by the closing of the main contactors 14, in particular in the form of counter-sound, to compensate at least partially for the first noise which is generated by the closing of the contactors 14. The output of this second noise is synchronized with the closing procedure of the contactors 14, so that the closing of the contactors 14 and the output of the second noise by the loudspeaker 26 occur almost at the same time. Alternatively or additionally, a tone or a sequence of tones can be output by the loudspeaker 26, in particular by suitable control by the control device 24, which drown out the noise of the closing of the main contactors 24. For this purpose, no synchronization with the closing of contactors 14 is necessary, so that the output of the tone or the tone sequence by the loudspeaker 26 can also take place somewhat earlier than the closing of contactors 14. Also in this case, the output of the tone or tone sequence is triggered by actuating the ignition of the motor vehicle 10, in particular by switching the ignition on. In another advantageous design of the present disclosure, it may be provided that the control device 18 for controlling the contactors 14 already causes a closing of the contactors 14 when a signal for unlocking the motor vehicle 10 has been received by the central locking system 22. The central locking system 22 then unlocks the motor vehicle 10 and in the meantime, the control device 18 controls the contactors 14 in order to close them. As a result, the noise of unlocking the doors is superimposed on the noise of closing the contactors 14, which also means that the latter is no longer perceived as strongly by a user. This measure for masking the noise when closing the contactors 14 is now explained again based on FIG. 2 and FIG. 3.

Figure 2:
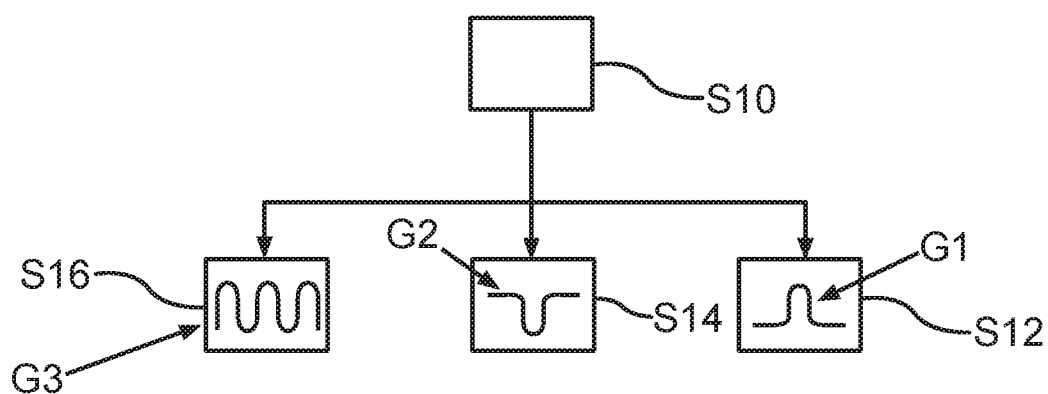
FIG. 2 shows a flow chart for illustration of an example method of masking a noise according to example embodiments of the present disclosure.

FIG. 2 shows a flowchart for the illustration of a method for masking a sound according to example embodiments of the present disclosure. The procedure starts here in step S10, in which an actuation of the ignition of the motor vehicle 10, in particular an activation of the ignition, is detected. The control device 18 then controls the main contactors 14 to close them. A first noise G1 is produced during this closing procedure. To compensate for this, in step S14 during the closing procedure of the contactors 14 a counter-sound signal G2 is at the same time output by a loudspeaker 26 of the motor vehicle. Alternatively or additionally, in step S16, a tone or tone sequence G3 can also be output through the loudspeaker 26 of the motor vehicle 10. The output of this tone or tone sequence G3 takes place in such a way that the main contactors 14 are closed while this tone or tone sequence is being output. The tone or tone sequence G3 can additionally be output even longer. In this way, the noise G1 generated when closing the contactors 14 can be concealed in a particularly advantageous and effective way.

Figure 3:
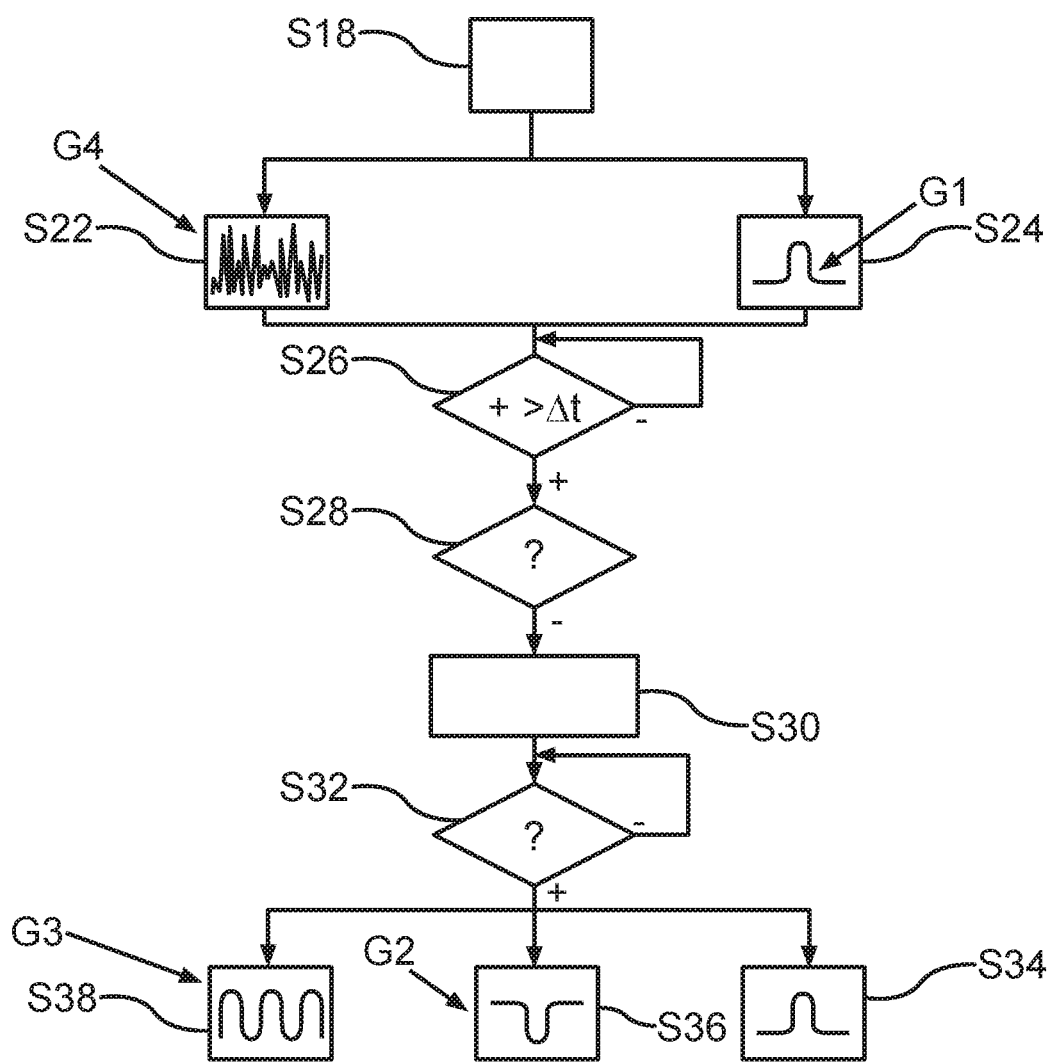
FIG. 3 shows a flow chart for illustration of an example method for masking a noise according to example embodiments of the present disclosure.

FIG. 3 shows a flow chart for illustration of a method for masking a noise G1 according to example embodiments of the present. Here, an unlocking signal is first received from the central locking device 22 in step S18. The central locking system 22 then causes the unlocking of the motor vehicle 10 in step S20. Here, too, a noise G4 is generated, which can now also be used advantageously for masking. Accordingly, after receiving the unlocking signal in step S18, the main contactors 14 are also controlled at the same time to close them in step S24. The closing of the main contactors 14 therefore takes place during the unlocking procedure of the motor vehicle 10, so that the noise G4 generated by the unlocking procedure is advantageously superimposed on the noise G1 generated when closing the main contactors 14. This also makes the closing noise of the contactor 14 much less perceptible to a user.

Furthermore, it can also be checked afterwards whether a predeterminable time span $\Delta t$ has already elapsed since closing the contactors 14 without activating the ignition of the motor vehicle 10. If the user does not actuate the ignition within a definable time $\Delta t$, the HV battery is disconnected again from the vehicle electrical system by opening the contactors and is reconnected, for example, by reopening, i.e. by unlocking the vehicle 10 again, by actuating the terminal 15, therefore, by activating the ignition. For example, in step 26 it can first be checked whether this predetermined time Δt has already expired and if so, it can be checked in step S28 whether the ignition of the motor vehicle 10 is activated or whether the engine of the motor vehicle has started. If this is not the case, the main contactors 14 are opened again in step S30. This can optionally be done in combination with the locking procedure of the central locking system 22. It can be checked again afterwards whether the ignition has been actuated. If it specifies in step S32 that the ignition of the motor vehicle 10 has now been activated, the contactors 14 are closed again in step S34, while in step S36 a complementary noise G2 can be output synchronously, and in particular also during which a tone or a tone sequence G3 can be output in step S38.

Altogether, the examples show how the present disclosure provides a method for masking a noise which makes it possible in a particularly low-cost, effective and simple manner to mask the noise when closing the main contactors of the motor vehicle battery.

The invention claimed is:

1. A method for masking a first noise generated by a part of a motor vehicle, the method comprising:
   initiating an unlocking process for unlocking one or more doors of the motor vehicle, the initiating representing a triggering condition;
   in response to the initiating, closing at least one main contactor assigned to a battery of the motor vehicle, wherein the closing the at least one main contactor generates the first noise; and
   in response to detecting the triggering condition, superimposing at least one second noise on the first noise to mask the first noise, wherein the at least one second noise comprises:
   an unlocking noise generated during the unlocking process; and
   a tone or tone sequence.

2. The method according to claim 1, further comprising:
   automatically opening the closed at least one main contactor when an actuation of an ignition of an engine of the motor vehicle does not occur for a predetermined time period after the closing.

3. The method according to claim 1, wherein the tone or tone sequence is output via a loudspeaker.

4. The method according to claim 1, wherein the tone or tone sequence is output over a longer time period that is longer than a time period of the first noise.

5. The method according to claim 1, wherein the tone or tone sequence is output beginning earlier than the first noise.

6. The method according to claim 1, further comprising:
   second initiating an ignition of an engine of the motor vehicle after a predetermined time period after the closing;
   in response to the second initiating, second closing the at least one main contactor assigned to the battery of the motor vehicle, wherein the second closing the at least one main contactor generates a third noise; and
   in response to detecting the second initiating, superimposing at least one fourth noise on the third noise to mask the third noise, wherein the at least one fourth noise comprises:
   a tone or tone sequence.

7. The method according to claim 6, wherein the tone or tone sequence is output via a loudspeaker.

8. The method according to claim 6, wherein the tone or tone sequence is output over a longer time period that is longer than a time period of the third noise.

9. The method according to claim 6, wherein the tone or tone sequence is output beginning earlier than the third noise.

10. A motor vehicle configured to mask a first noise generated by a part of the motor vehicle, the motor vehicle comprising a control device configured to:
    initiate an unlocking process for unlocking one or more doors of the motor vehicle, the initiating representing a triggering condition;
    in response to the initiating, close at least one main contactor assigned to a battery of the motor vehicle, wherein the closing the at least one main contactor generates the first noise; and
    in response to detecting the triggering condition, superimpose at least one second noise on the first noise to mask the first noise, wherein the at least one second noise comprises:
    an unlocking noise generated during the unlocking process; and
    a tone or tone sequence.

11. The motor vehicle according to claim 10, wherein the control device is further configured to:
    automatically open the closed at least one main contactor when an actuation of an ignition of an engine of the motor vehicle does not occur for a predetermined time period after the closing.

12. The motor vehicle according to claim 10, wherein the tone or tone sequence is output via a loudspeaker.

13. The motor vehicle according to claim 10, wherein the tone or tone sequence is output over a longer time period that is longer than a time period of the first noise.

14. The motor vehicle according to claim 10, wherein the tone or tone sequence is output beginning earlier than the first noise.

15. The motor vehicle according to claim 10, wherein the control device is further configured to:
    second initiate an ignition of an engine of the motor vehicle after a predetermined time period after the closing;
    in response to the second initiating, second close the at least one main contactor assigned to the battery of the motor vehicle, wherein the second closing the at least one main contactor generates a third noise; and
    in response to the second initiating, superimpose at least one fourth noise on the third noise to mask the third noise, wherein the at least one fourth noise comprises:
    a tone or tone sequence.

16. The motor vehicle according to claim 15, wherein the tone or tone sequence is output via a loudspeaker.

17. The motor vehicle according to claim 15, wherein the tone or tone sequence is output over a longer time period that is longer than a time period of the third noise.

18. The motor vehicle according to claim 15, wherein the tone or tone sequence is output beginning earlier than the third noise.

* * * * *